United States Patent
Hintzen et al.

(10) Patent No.: US 10,933,919 B2
(45) Date of Patent: Mar. 2, 2021

(54) SHOCK ABSORBER MOUNT

(71) Applicant: Ford Global Technologies, LLC, Dearborn, MI (US)

(72) Inventors: Ralf Hintzen, Aachen (DE); Friedrich Peter Wolf-Monheim, Aachen (DE); Daniel Mainz, Herzogenrath (DE); Timothy Drotar, Commerce Township, MI (US); Paul Zandbergen, Würselen (DE); Nicole Zandbergen, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 15/237,923

(22) Filed: Aug. 16, 2016

(65) Prior Publication Data
US 2017/0050680 A1    Feb. 23, 2017

(30) Foreign Application Priority Data
Aug. 19, 2015    (DE) .......................... 10 2015 215 764

(51) Int. Cl.
*B62D 25/08*    (2006.01)
*B60G 13/00*    (2006.01)

(52) U.S. Cl.
CPC ......... *B62D 25/088* (2013.01); *B60G 13/003* (2013.01); *B60G 2204/128* (2013.01)

(58) Field of Classification Search
CPC ............... B62D 25/088; B60G 13/003; B60G 2204/128
See application file for complete search history.

(56) References Cited

U.S. PATENT DOCUMENTS

| 4,081,187 A | * | 3/1978 | Evertz | B60G 11/16 267/173 |
| 4,175,771 A | * | 11/1979 | Muzechuk | B60G 15/068 267/220 |
| 4,324,416 A | * | 4/1982 | Schneeweiss | B60G 7/005 280/86.757 |
| 4,650,208 A | * | 3/1987 | Mason | B62D 17/00 280/86.757 |
| 4,909,642 A | * | 3/1990 | Hoermandinger | B60G 15/068 267/220 |
| 4,946,188 A | * | 8/1990 | Key | B60G 15/068 280/86.752 |

(Continued)

FOREIGN PATENT DOCUMENTS

| CN | 101445027 A | 6/2009 | |
| DE | 4340556 A1 | * 6/1995 | .......... B60G 15/068 |
| EP | 0678442 B1 | 3/1998 | |

OTHER PUBLICATIONS

Lauer et al., Wheel suspension with McPherson shock absorbing strut for front axle, Jun. 1, 1995, German Patent Office, DE 43 40 556 A1, English Abstract (Year: 1995).*

(Continued)

*Primary Examiner* — James A English
(74) *Attorney, Agent, or Firm* — Raymond L. Coppiellie; Burgess Law Office, PLLC

(57) ABSTRACT

A mount located in a wheel housing of a motor vehicle, the mount receiving an upper end of a shock absorber. The mount has a plurality of upper receiving points each mounting point for allowing a different shock absorber orientation.

8 Claims, 2 Drawing Sheets

(56) References Cited

U.S. PATENT DOCUMENTS

| | | | |
|---|---|---|---|
| 4,974,872 A | 12/1990 | Riese | |
| 5,263,736 A | 11/1993 | Stevens | |
| 5,467,971 A * | 11/1995 | Hurtubise | B60G 15/068 188/322.12 |
| 5,536,035 A | 7/1996 | Bautz et al. | |
| 6,382,645 B1 * | 5/2002 | Gravelle | B60G 15/068 280/124.147 |
| 7,370,869 B2 * | 5/2008 | Kang | B60G 15/07 280/124.147 |
| 7,392,978 B2 * | 7/2008 | Carlitz | B60G 11/14 267/221 |
| 7,581,740 B1 * | 9/2009 | Stimely | B60G 3/20 280/124.136 |
| 8,302,980 B2 * | 11/2012 | Scolaro | B60G 15/068 280/124.147 |
| 2014/0375012 A1 * | 12/2014 | Cho | B60G 13/003 280/124.109 |

OTHER PUBLICATIONS

Lauer et al., Wheel suspension with McPherson shock absorbing strut for front axle, Jun. 1, 1995, German Patent Office, DE 43 40 556 A1, Machine Translation of Description (Year: 1995).*

* cited by examiner

SHOCK ABSORBER MOUNT

CROSS-REFERENCE TO RELATED APPLICATIONS

Not Applicable.

BACKGROUND OF THE INVENTION

1. Field of the Invention

The invention relates to a motor vehicle; and more specifically, to a mount for receiving an upper end of a shock absorber.

2. Description of Related Art

Vehicle suspension systems typically include elements, such as springs and shock absorbers, positioned between each wheel and the car body or frame. The suspension system provides predetermined handling characteristics and isolates the vehicle from road disturbances.

Various types of suspension systems exist including a double wishbone, or upper and lower A-arm, suspension. A double wishbone suspension uses two wishbone-shaped arms to locate the wheel. Each wishbone or arm has two mounting points to the chassis and one joint at the knuckle.

A short long arms suspension (SLA) is a similar suspension system having an unequal length double wishbone suspension. The upper arm is typically an A-arm, and is shorter than the lower link, which is an A-arm or an L-arm, or sometimes a pair of tension/compression arms.

In addition, a MacPherson strut or turnable strut is a suspension system using the top of a telescopic damper as the upper steering pivot.

Each suspension system typically requires a specific upper mounting assembly for a shock absorber making it difficult to give individual vehicles different suspension systems.

SUMMARY OF THE INVENTION

A motor vehicle assembly including a wheel housing. A mount secured in the wheel housing with the mount having a first receiving point and a second receiving point. A shock absorber is attached at one end thereof to one of the first receiving point and the second receiving point.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

This description of the preferred embodiment(s) is merely exemplary in nature and is not intended to limit the invention, its application, or uses. Further advantageous details and effects of the invention are explained in the text, which follows with reference to different exemplary embodiments illustrated in the figures, where identical parts are always provided with the same reference symbol throughout the different figures, and the parts are generally described only once.

Figure 1:
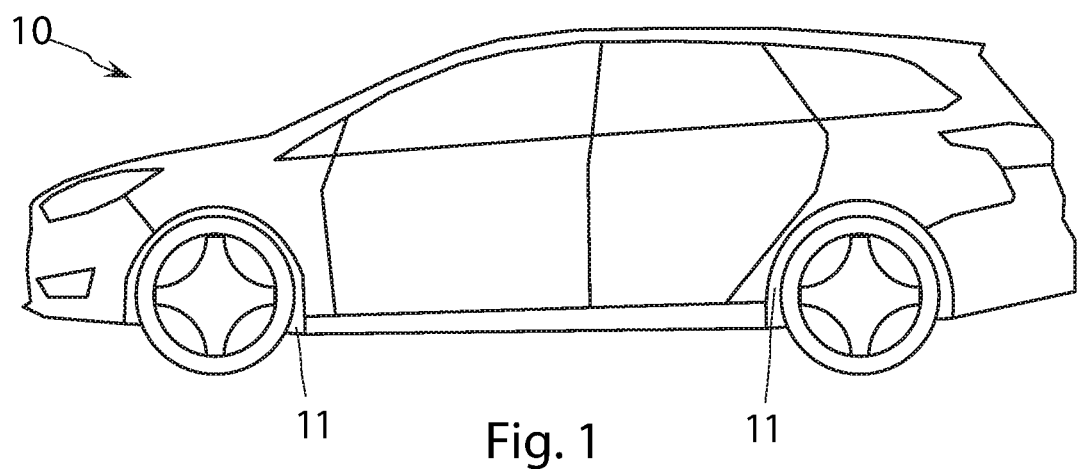
FIG. 1 shows a motor vehicle according to the invention in an exemplary embodiment.

FIG. 1 shows a motor vehicle 10 according to the invention in an exemplary embodiment. The motor vehicle 10 includes at least one wheel housing 11 assigned to a front axle or a rear axle of the motor vehicle 10. In a drivable state of the motor vehicle 10, a wheel is in the wheel housing 11. The dual-axle motor vehicle 10 illustrated, therefore, has four wheel housings 11.

Figure 2:
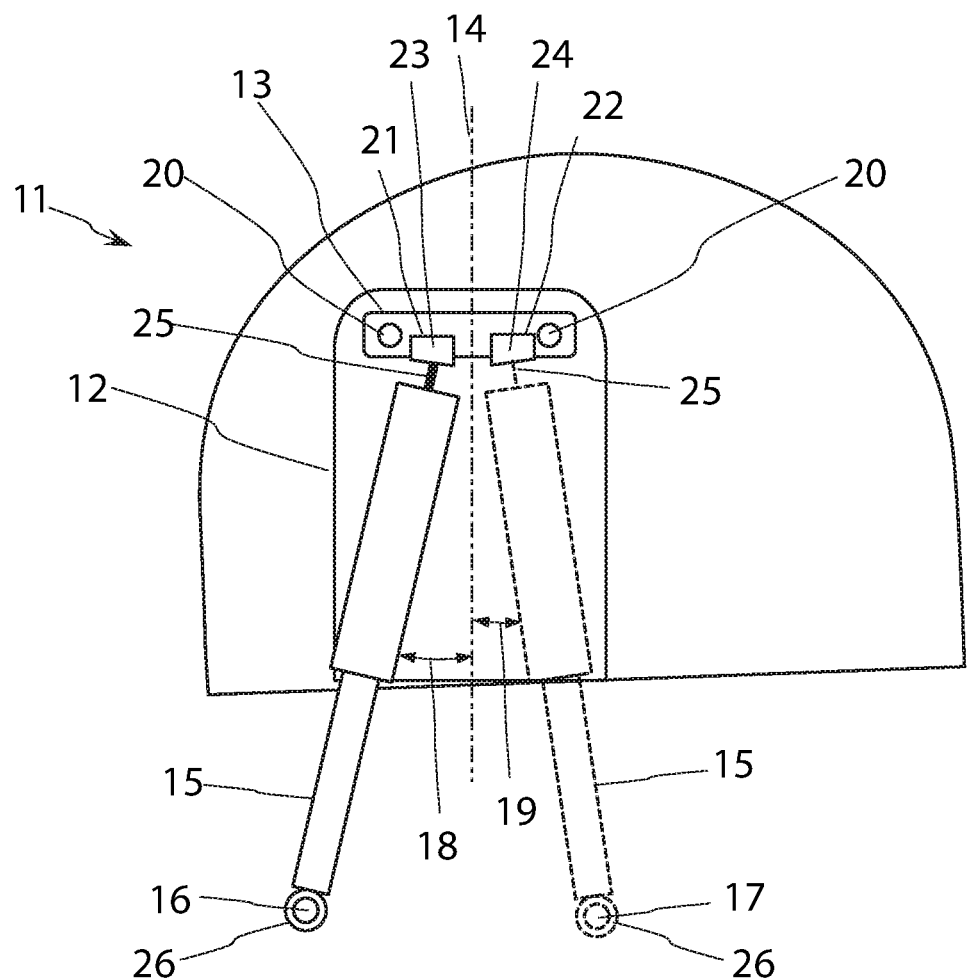
FIG. 2 shows a wheel housing of the motor vehicle including a mount according to an exemplary first embodiment.

FIG. 2 shows an exemplary embodiment of the wheel housing 11 having a reinforcement 12 configured to increase the rigidity of the wheel housing 11. A mount 13 located in the wheel housing 11 of the motor vehicle 10 is shown in two exemplary embodiments in FIGS. 3 and 4. The mount 13 configured for attachment to the wheel housing 11. As shown, fastening apertures 20, in the form of two bores, in the mount 13 receive fastening elements, for example threaded fasteners or screws, for attaching the mount to the wheel housing 11.

Figure 3:
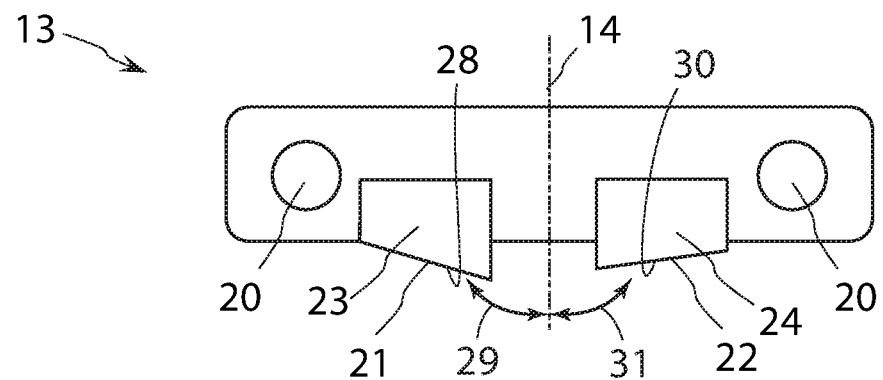
FIG. 3 shows an enlarged view of the mount of FIG. 1.

The mount 13 is configured to receive an upper end 25 of a shock absorber 15 at different upper receiving points 23, 24. As shown in FIGS. 2 and 3 the first upper receiving point 23 and the second upper receiving point 24 have different configurations. The second upper receiving point 24 is positioned at a different position or location from the first upper receiving point 23. FIG. 2 shows the two upper receiving points 23, 24 by the simultaneous view of two shock absorbers 15. In the mounted state, only one shock absorber 15 connects to the mount 13, with FIG. 2 showing the other shock absorber or alternative mount arrangement in phantom.

The shock absorber 15 has a lower end 26 opposing the upper end 25. In the mounted state, the lower end 26 connects at a lower receiving point 16, 17 to a wheel suspension of the motor vehicle 10, for example to a wishbone. The position of the lower receiving point 16, 17 defined or decided by the design of the wheel suspension and may vary, depending on the design or type of the wheel suspension. For example, a first wheel suspension provided for the motor vehicle 10 has a first lower receiving point 16 and a second wheel suspension for the same type of motor vehicle has a second lower receiving point 17.

The mount 13 is used with a motor vehicle 10 having either a first wheel suspension or a second wheel suspension. As shown, depending on the particular wheel suspension, the shock absorber 15 is mounted in the motor vehicle 10 in a first arrangement with its lower end 26 in the first lower receiving point 16 and with its upper end 25 in the first upper receiving point 23 or in a second arrangement with its lower end 26 in the second lower receiving point 17 and with its upper end 25 in the second upper receiving point 24. The mount 13 is, therefore, compatible with both wheel suspensions.

As disclosed, the mount 13 according to the invention includes at least two exemplary embodiments. FIGS. 2 and 3, show a first exemplary embodiment and FIG. 4 shows a second exemplary embodiment.

In the first exemplary embodiment, the mount 13 includes two receiving elements 21, 22. The first receiving element 21 configured for receiving the upper end 25 of the shock absorber 15 at the first upper receiving point 23 and a second receiving element 22 configured for receiving the upper end 25 of the shock absorber 15 at the second upper receiving point 24.

FIG. 3 shows the first receiving element 21 having a mounting face 28 extending at an obtuse angle 29 with respect to the vertical axis 14 and the second receiving element 22 having a mounting face 30 extending at an obtuse angle 31. The mounting faces 28, 30 configuring the two receiving elements 21, 22 wherein, in the mounted state, the shock absorber 15 extends at different angles of incidence 18, 19 relative to a vertical axis 14. In particular, the first receiving element 21 configured to receive the shock absorber 15 at a first angle of incidence 18 and the second receiving element 22 configured to receive the shock absorber 15 at a second angle of incidence 19. As shown in FIG. 2 the first angle of incidence 18 is larger than the second angle of incidence 19.

Figure 4:
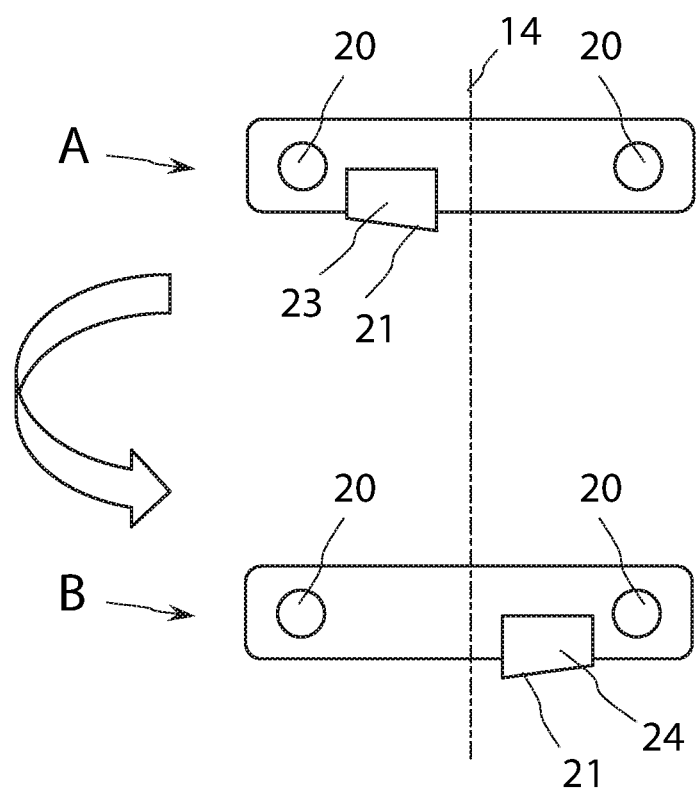
FIG. 4 shows an additional embodiment of the mount.

FIG. 4 shows the second exemplary embodiment wherein the mount 13 includes a single, first receiving element 21. Depending on the orientation A, B of the mount 13, the first receiving element 21 configured to provide different upper receiving points 23, 24. In particular, in a first orientation A of the mount 13, the upper end 25 of the shock absorber 15 is arranged at the first upper receiving point 23 and in a second orientation B of the mount 13 the upper end 25 of the shock absorber 15 is arranged at the second upper receiving point 24. The different orientations A, B are achieved, in particular, by rotating the mount 13. In particular, as shown in FIG. 4, in the second orientation B the mount 13 is rotated by 180° about the vertical axis 14 relative to the first orientation A. turning the mount 13 brings the first receiving element 21 onto the opposing side of the vertical axis 14. Here the fastening elements 20 are configured symmetrically to the vertical axis 14.

In a further embodiment, similar to the first exemplary embodiment, the first exemplary embodiment of the mount 13 may be designed to be rotatable or turnable and thus able to be mounted from two sides. Rotating the mount 13 of the first exemplary embodiment by 180° about the vertical axis 14 produces a third upper receiving point and a fourth upper receiving point.

The disclosed exemplary embodiments permit use of a single mounting for different types of wheel suspension, those typically requiring different upper receiving points, or different installation points. Providing to upper receiving options for a single assembly situation reduces the number of different parts, which reduces the cost of the production of a motor vehicle.

Because the first receiving element is configured to receive the shock absorber at a first angle of incidence and the second receiving element is configured to receive the shock absorber at a second angle of incidence different chassis designs may be produced with a single mount-wheel housing combination.

Alternatively, the mount includes a first receiving element configured in a first orientation of the mounting to receive the upper end at the first upper receiving point and configured in a second orientation of the mounting to receive the upper end at the second upper receiving point. In particular, the mounting in the second orientation is rotated by 180° relative to the first orientation. Accordingly, the second upper receiving point may be produced simply by assembling the mounting in a different orientation, in particular by turning the mounting. The capacity for turning additionally ensures the option of assembling the mounting both on the driver's side and on the passenger side of the motor vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mount fastened in a wheel housing of a motor vehicle and receiving an upper end of a shock absorber comprising:
   the mount having a longitudinal axis;
   a first upper receiving point on the mount and a second upper receiving point on the mount;
   the first upper receiving point includes a first receiving element having a first receiving element mounting face for receiving the upper end of the shock absorber at the first upper receiving point and the second upper receiving point includes a second receiving element having a second receiving element mounting face for receiving the upper end of the shock absorber at the second upper receiving point; and
   the first receiving element mounting face extending at an obtuse angle to an axis perpendicular to the longitudinal axis of the mount and configured to receive the upper end of the shock absorber so the shock absorber extends at a first angle of incidence on one side of the axis perpendicular to the longitudinal axis of the mount and the second receiving element mounting face extending at an obtuse angle to an axis perpendicular to the longitudinal axis of the mount and configured to receive the upper end of the shock absorber so the shock absorber extends at a second angle of incidence on an opposing side of the axis perpendicular to the longitudinal axis of the mount.

2. A vehicle comprising:
   a wheel housing;
   a first wheel suspension configuration and a second wheel suspension configuration, the first wheel suspension configuration having a first wheel suspension lower receiving point and the second wheel suspension configuration having a second wheel suspension lower receiving point, the first wheel suspension lower receiving point and the second wheel suspension lower receiving point located at different positions;
   a mount, said mount secured in said wheel housing and having a first mount receiving point and a second mount receiving point; and
   a shock absorber, connected to the mount at one of the first mount receiving point and the second mount receiving point, when connected to the first mount receiving point the shock absorber extends between the first mount receiving point and the first wheel suspension lower receiving point and when connected to the second mount receiving point the shock absorber extends between the second mount receiving point and the second wheel suspension lower receiving point wherein the first and second mount receiving points are configured to receive an upper end of the shock absorber and the first and second wheel suspension lower receiving points are configured to receive a lower end of the shock absorber.

3. The vehicle of claim 2 wherein the mount includes a first receiving element for receiving the upper end of the shock absorber at the first mount receiving point and a second receiving element for receiving the upper end of the shock absorber at the second mount receiving point.

4. The vehicle of claim 3 wherein the first receiving element includes a mounting face extending at an obtuse angle and configured to receive the upper end of the shock absorber so the shock absorber extends at a first angle of incidence and the second receiving element includes a mounting face extending at an obtuse angle and configured to receive the upper end of the shock absorber so the shock absorber extends at a second angle of incidence.

5. The vehicle of claim 4 wherein the mount is rotatable by 180° relative to a first orientation.

6. A vehicle comprising:

a wheel housing;

a mount, said mount secured in the wheel housing and having a first mount receiving point and a second mount receiving point;

a first wheel suspension configuration and a second wheel suspension configuration, the first wheel suspension configuration having a first wheel suspension lower receiving point and the second wheel suspension configuration having a second wheel suspension lower receiving point; and a single shock absorber connected to the mount and extending between the first mount receiving point and the first wheel suspension lower receiving point in the first wheel suspension configuration and the second mount receiving point and the second wheel suspension lower receiving point in the second wheel suspension configuration.

7. The vehicle of claim 6 wherein the first mount receiving point is spaced from the second mount receiving point, the first mount receiving point includes a mounting face extending at an obtuse angle and configured to receive an upper end of the shock absorber so the shock absorber extends at a first angle of incidence and the second mount receiving point includes a mounting face extending at an obtuse angle and configured to receive the upper end of the shock absorber so the shock absorber extends at a second angle of incidence.

8. The vehicle of claim 6 wherein the mount is rotatable by 180° relative to a first orientation.

\* \* \* \* \*